US011556573B2

(12) United States Patent
Srinivasan et al.

(10) Patent No.: US 11,556,573 B2
(45) Date of Patent: Jan. 17, 2023

(54) SEMANTIC CLUSTER FORMATION IN DEEP LEARNING INTELLIGENT ASSISTANTS

(71) Applicant: Adobe Inc., San Jose, CA (US)

(72) Inventors: Balaji Vasan Srinivasan, Bangalore (IN); Sujith Sai Venna, Hyderabad (IN); Kuldeep Kulkarni, Karnataka (IN); Durga Prasad Maram, Hyderabad (IN); Dasireddy Sai Shritishma Reddy, Hyderabad (IN)

(73) Assignee: ADOBE INC., San Jose, CA (US)

( * ) Notice: Subject to any disclaimer, the term of this patent is extended or adjusted under 35 U.S.C. 154(b) by 137 days.

(21) Appl. No.: 16/888,082

(22) Filed: May 29, 2020

(65) Prior Publication Data

US 2021/0374168 A1    Dec. 2, 2021

(51) Int. Cl.
| | | |
|---|---|---|
| *G06F 16/00* | (2019.01) | |
| *G06F 16/332* | (2019.01) | |
| *G06F 16/35* | (2019.01) | |
| *G06F 17/18* | (2006.01) | |
| *G06N 3/08* | (2006.01) | |
| *G06V 30/148* | (2022.01) | |
| *G06V 30/10* | (2022.01) | |

(52) U.S. Cl.
CPC ........ *G06F 16/3329* (2019.01); *G06F 16/355* (2019.01); *G06F 17/18* (2013.01); *G06N 3/08* (2013.01); *G06V 30/153* (2022.01); *G06V 30/10* (2022.01)

(58) Field of Classification Search
CPC .... G06F 16/3329; G06F 16/355; G06F 17/18; G06F 16/2452; G06F 16/24534; G06F 16/3332; G06F 16/8358; G06N 3/08; G06V 30/153; G06V 30/10; G06V 10/82; G06V 30/274; G06K 9/6271; G06K 9/6221

See application file for complete search history.

(56) References Cited

U.S. PATENT DOCUMENTS

| | | | | |
|---|---|---|---|---|
| 8,484,201 | B2 * | 7/2013 | Li | G06F 16/3329 |
| | | | | 707/723 |
| 9,940,323 | B2 * | 4/2018 | Boyer | G06N 20/00 |
| 10,223,341 | B1 * | 3/2019 | Jain | G06F 40/166 |

(Continued)

OTHER PUBLICATIONS

Nogueira, R., & Cho, K. (2019). Passage Re-ranking with BERT. arXiv preprint arXiv:1901.04085.

(Continued)

*Primary Examiner* — Noosha Arjomandi
(74) *Attorney, Agent, or Firm* — Shook, Hardy & Bacon L.L.P.

(57) ABSTRACT

Enhanced techniques and circuitry are presented herein for providing responses to questions from among digital documentation sources spanning various documentation formats, versions, and types. One example includes a method comprising receiving an indication of a question directed to subject having a documentation corpus, determining a set of passages of the documentation corpus related to the question, ranking the set of passages according to relevance to the question, forming semantic clusters comprising sentences extracted from ranked ones of the set of passages according to sentence similarity, and providing a response to the question based at least on a selected semantic cluster.

18 Claims, 8 Drawing Sheets

(56) References Cited

U.S. PATENT DOCUMENTS

| | | | |
|---|---|---|---|
| 10,586,156 B2* | 3/2020 | Merdivan | G06F 16/3329 |
| 11,200,510 B2* | 12/2021 | Boyer | G06N 5/041 |
| 11,244,256 B2* | 2/2022 | Neuweg | G06Q 40/025 |
| 2012/0078895 A1* | 3/2012 | Chu-Carroll | G06F 16/332 707/E17.014 |
| 2012/0084112 A1* | 4/2012 | Bagchi | G06Q 10/063112 705/7.14 |
| 2016/0350406 A1* | 12/2016 | Byron | G06F 40/247 |
| 2018/0018576 A1* | 1/2018 | Boyer | G06F 16/355 |
| 2018/0089315 A1* | 3/2018 | Seiber | G06F 16/68 |
| 2019/0205322 A1* | 7/2019 | Dobrynin | G06F 16/355 |
| 2020/0081964 A1* | 3/2020 | Maneriker | G06F 40/166 |
| 2020/0218988 A1* | 7/2020 | Boxwell | G06F 40/30 |
| 2020/0250213 A1* | 8/2020 | Duchin | G06F 16/319 |
| 2020/0380038 A1* | 12/2020 | Rosset | G06F 16/313 |
| 2021/0158093 A1* | 5/2021 | Kaynig-Fittkau | G06V 30/19147 |
| 2021/0374168 A1* | 12/2021 | Srinivasan | G06V 30/274 |

OTHER PUBLICATIONS

Wu, J., Yang, Y., Deng, C., Tang, H., Wang, B., Sun, H., . . . & Zhang, Q. (2019). Sogou Machine Reading Comprehension Toolkit. arXiv preprint arXiv:1903.11848.

Devlin, J., Chang, M. W., Lee, K., & Toutanova, K. (2018). Bert: Pre-training of deep bidirectional transformers for language understanding. arXiv preprint arXiv:1810.04805.

Reddy, S., Chen, D., & Manning, C. D. (2019). Coqa: A conversational question answering challenge. Transactions of the Association for Computational Linguistics, 7, 249-266.

Cer, D., Yang, Y., Kong, S. Y., Hua, N., Limtiaco, N., John, R. S., . . . & Sung, Y. H. (2018). Universal sentence encoder arXiv preprint arXiv:1803.11175.

Ku, P., Ma, X., Nallapati, R., & Xiang, B. (2019). Passage Ranking with Weak Supervision. arXiv preprint arXiv:1905.05910.

Yang, L., Ai, Q., Spina, D., Chen, R. C., Pang, L., Croft, W. B., . . . & Scholer, F. (Mar. 2016). Beyond factoid QA: Effective methods for non-factoid answer sentence retrieval. In European Conference on Information Retrieval (pp. 115-128). Springer, Cham.

Cohen, D., Yang, L., & Croft, W. B. (Jun. 2018). Wikipassageqa: A benchmark collection for research on non-factoid answer passage retrieval. In The 41st International ACM SIGIR Conference on Research & Development in Information Retrieval (pp. 1165-1168).

Yoon, S., Shin, J., & Jung, K. (2017). Learning to rank question-answer pairs using hierarchical recurrent encoder with latent topic clustering. arXiv preprint arXiv:1710.03430.

Chen, D., Bolton, J., & Manning, C. D. (2016). A thorough examination of the cnn/daily mail reading comprehension task. arXiv preprint arXiv:1606.02858.

Nguyen, T., Rosenberg, M., Song, X., Gao, J., Tiwary, S., Majumder, R., & Deng, L. (2016). Ms marco: A human-generated machine reading comprehension dataset.

Rajpurkar, P., Zhang, J., Lopyrev, K., & Liang, P. (2016). Squad: 100,000+ questions for machine comprehension of text arXiv preprint arXiv:1606.05250.

Choi, E., He, H., Iyyer, M., Yatskar, M., Yih, W. T., Choi, Y., . . . & Zettlemoyer, L. (2018). Quac: Question answering in context. arXiv preprint arXiv:1808.07036.

Chen, K., Bui, T., Fang, C., Wang, Z., & Nevatia, R. (2017). AMC: Attention guided multi-modal correlation learning for image search. In Proceedings of the IEEE Conference on Computer Vision and Pattern Recognition (pp. 2644-2652).

Barzilay, R., & Lapata, M. (2008). Modeling local coherence: An entity-based approach. Computational Linguistics, 34 (1), 1-34.

Antol, S., Agrawal, A., Lu, J., Mitchell, M., Batra, D., Lawrence Zitnick, C., & Parikh, D. (2015). Vqa: Visual question answering. In Proceedings of the IEEE international conference on computer vision (pp. 2425-2433).

Yang, Z., He, X., Gao, J., Deng, L., & Smola, A. (2016). Stacked attention networks for image question answering. In Proceedings of the IEEE conference on computer vision and pattern recognition (pp. 21-29).

Lu, J., Yang, J., Batra, D., & Parikh, D. (2016). Hierarchical question-image co-attention for visual question answering. In Advances in neural information processing systems (pp. 289-297).

Kwiatkowski, T., Palomaki, J., Redfield, O., Collins, M., Parikh, A., Alberti, C., . . . & Toutanova, K. (2019). Natural questions: a benchmark for question answering research. Transactions of the Association for Computational Linguistics, 7, 453-466.

Max Irwin, "Understanding BERT and Search Relevance," OpenSource Connections, Nov. 5, 2019, downloaded from https://opensourceconnections.com/blog/2019/11/05/understanding-bert-and-search-relevance/ on Apr. 22, 2020, 7 pages.

Nils Reimers and Iryna Gurevych, "Sentence-BERT: Sentence Embeddings using Siamese BERT-Networks," Proceedings of the 2019 Conference on Empirical Methods in Natural Language Processing and the 9th International Joint Conference on Natural Language Processing, Nov. 3-7, 2019, pp. 3982-3992.

Jacob Devlin, et al., "BERT: Pre-training of Deep Bidirectional Transformers for Language Understanding," May 24, 2019, downloaded from https://arxiv.org/pdf/1810.04805.pdf on Apr. 22, 2020, 6 pages.

Allison Linn, "Microsoft creates AI that can read a document and answer questions about it as well as a person" Jan. 15, 2018, downloaded from https://blogs.microsoft.com/ai/microsoft-creates-ai-can-read-document-answer-questions-well-person/ on Jun. 22, 2022.

Susan Cunningham, "Introducing Vincent: the first intelligent legal research assistant of its kind" Sep. 19, 2018, downloaded from https://blog.vlex.com/introducing-vincent-the-first-intelligent-legal-research-assistant-of-its-kind-of14b00a3152 on Jun. 22, 2022.

"Azure Bot Service documentation", downloaded from https://web.archive.org/web/20200523070004/https://docs.microsoft.com/en-us/azure/bot-service/?view=azure-bot-service-4.0 on Jun. 22, 2022.

Jboback et al., "Accept active learning suggested questions in the knowledge base" Apr. 6, 2020, downloaded from https://web.archive.org/web/20200612084942/https://docs.microsoft.com/en-us/azure/cognitive-services/qnamaker/how-to/improve-knowledge-base on Jun. 22, 2022.

\* cited by examiner

SEMANTIC CLUSTER FORMATION IN DEEP LEARNING INTELLIGENT ASSISTANTS

TECHNICAL FIELD

Aspects of the disclosure are related to the field of handling questions directed to digital documentation using deep learning architectures.

BACKGROUND

The complexity of various software applications and platforms has continued to increase. Users can be challenged to find documentation sources in order to employ the various features and functions of complex software applications and platforms. When users require assistance, the users usually manually refer to corresponding documentation, watch tutorial videos, use Internet-based search engines, or seek trained professionals to help. Documentation can be detail-rich and contain a great deal of information regarding the software. However, documentation poses several challenges to the user when seeking information. First, for complex software applications and platforms, documentation can be too vast and difficult to navigate in a reasonable amount of time. Second, customized software implementations are often accompanied by additional documentation separate from the main set of documentation. Third, automated searching of documentation is typically limited to keyword searches, which only produce imprecise results for users. Moreover, reading through the complete set of documentation can be time-consuming, and such an exercise may not provide the user with knowledge as to which features of the software application or platform can provide solutions to specific questions. Customizations and upgrades to the software might involve additional documentation and versioning which can introduce disparities among the various sources of documentation.

Overview

Enhanced techniques and circuitry are presented herein for providing responses to questions from among digital documentation sources spanning various documentation formats, versions, and types. One example includes a method comprising receiving an indication of a question directed to subject having a documentation corpus, determining a set of passages of the documentation corpus related to the question, ranking the set of passages according to relevance to the question, forming semantic clusters comprising sentences extracted from ranked ones of the set of passages according to sentence similarity, and providing a response to the question based at least on a selected semantic cluster.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
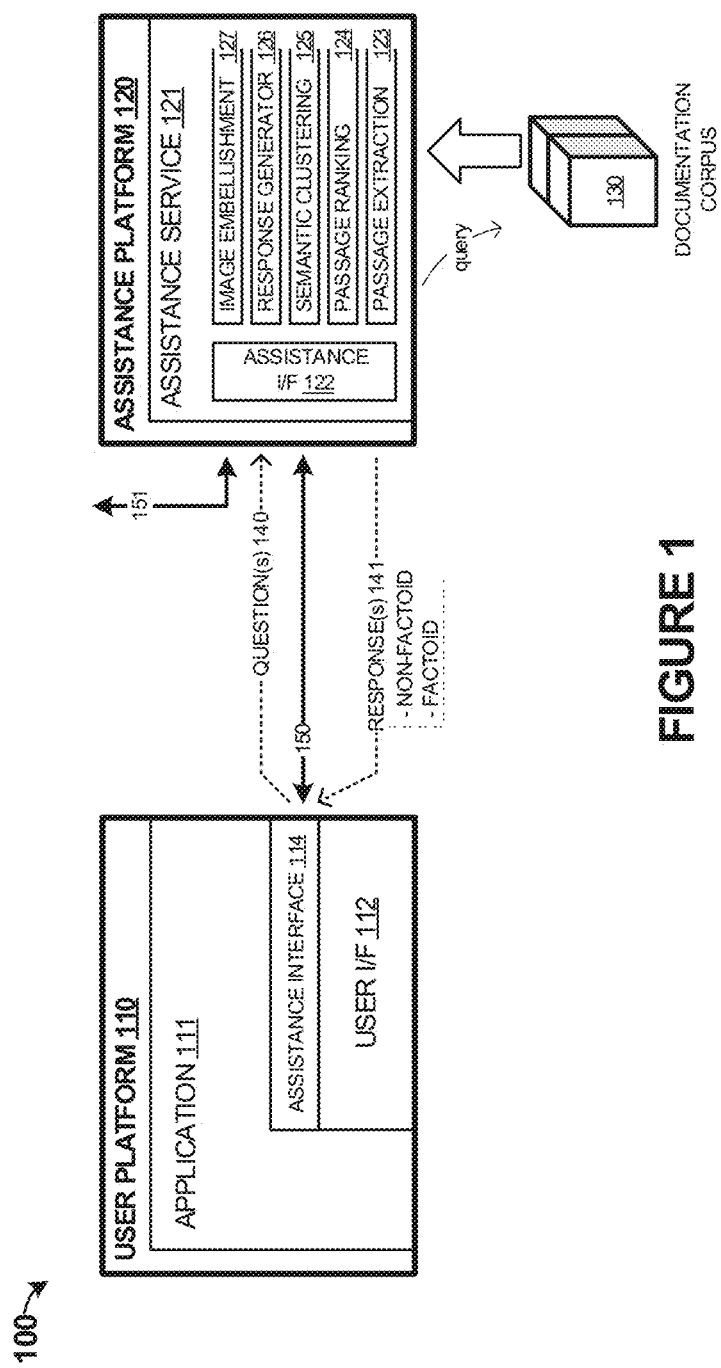
FIG. 1 illustrates a user assistance system in an implementation.

Popular search engines provide user searches by processing same or similar words against a database and retrieve relevant documents or sometimes paragraphs in which the searched or similar words are present. Standard search engines provide snippets of passages in results. However, these snippets are formed based on explicitly-determined knowledge graphs or indexes formed prior to a user question and possibly only after a threshold quantity of user searches occur. Thus, these standard search engines do not provide precise responses for what a user is searching. Even when indexed, not all user questions are answered due to the lack of taxonomic relationships for less-frequent facts. To address this, standard search engines build a knowledge graph on the information sources with relationship taxonomies accounting for facts in the knowledge graph. Unlike facts extracted from a large web corpus information source, facts from a much smaller or focused documentation corpus can be noisy and would need robust algorithms and strong taxonomy to filter out relevant and irrelevant information. Thus, it is non-trivial to achieve an infrastructure to enable knowledge graph-based answering. However, the proposed intelligent assistant examples herein achieve results via a response generation algorithms that generates both factual and non-factual answers without usage of a knowledge graph or prior indexing.

Virtual Assistants interact with users using voice commands or gestures, and are task oriented (i.e. perform tasks like playing music, setting an alarm, etc.). These virtual assistants rely on identifying predefined intents from the user commands and execute the task based on a family of preloaded commands. For a new user question, virtual assistants identify the intent and similarity to the pre-trained commands to perform the specific tasks. While these virtual assistants are capable of understanding user context to a certain extent, virtual assistants cannot easily extend to new domains or provide composite results based on a documentation corpus. Advantageously, the intelligent assistant examples herein employ context for user questions. Context is achieved by parsing user questions along with a current conversation context and retrieving relevant passages of a documentation corpus that might contain the answers. The passages are processed along with the question to identify an exact answer to the user question. Finally, the answer may be embellished with an image to improve the user understanding.

Discussed herein are examples of enhanced intelligent assistants that provide responses to questions, queries, or text-containing inquiries. These questions might originate from users/operators or be issued by computing systems that handle interfacing for intelligent assistance platforms and services. A set of documentation, referred to herein as a documentation corpus, is employed as a source from which responses and associated answers are determined. In one implementation, an intelligent assistant receives an indication of a question directed to a documentation corpus, and responsively establishes a query comprising keywords indicated by at least the question. The intelligent assistant issues the query against the documentation corpus to retrieve a set of passages of the documentation corpus. A deep learning architecture is employed to rank the set of passages according to relevance to the query. From here, the intelligent assistant further employs deep learning techniques to establish semantic clusters comprising sentences extracted from ranked ones of the set of passages according to sentence similarity. These semantic clusters are used to determine a response to the question, which are provided to an interface or ultimately to one or more users/operators. In one instance, the question indicates that the answer should be provided as a non-factoid response, and a top ranked semantic cluster is provided as the response. In another instance, the question indicates that an answer should be provided as a factoid response, and a portion of a top ranked semantic cluster is used to form a concise factoid response. The difference between factoid and non-factoid responses are discussed in detail below. [00.16] The intelligent assistant examples herein use text received indicating a question along with question context from one or more prior questions to determine a response for the question, which employs a deep semantic understanding of the question and the context. The examples herein achieve this with a combination of question classification and response generation based on the question type. Moreover, the examples herein are capable of combining information from multiple retrieved passages, removing the need to look at multiple sources for determining an answer. Thus, intelligent assistant examples discussed herein provides additional enhancements over what standard search engines can do by giving concise information which is needed and most relevant. Moreover, the intelligent assistant examples discussed herein are capable of retrieving and combining information from multiple documents, pages, or passages which prevents the need to look for relevant information from multiple documents or source materials manually.

In one example, users of software packages and website content management platforms, such as content management applications, content management software platforms, website content management products, website asset management products, integrated online marketing software products, or web analytics products, consult documentation sources specific to the software package in order to discover or employ various features and functions. However, this documentation is typically detail-rich and contains a great deal of information regarding the software and operations. Moreover, documentation can be split over various manuals, guides, versions, revisions, and add-ins or customizations. Automated searching of documentation is typically limited to keyword searches, which only produce imprecise results for users and lack illustrated figures and related content. To address these problems, the examples herein provide for an intelligent assistant built on top of a documentation corpus across several documentation or software versions and across custom software implementations. The intelligent assistant is designed to understand the current software version and the previous versions along with user context to provide answers to questions posed by the users. The intelligent assistant provides contextually enhanced responses to questions from among multiple documentation sources and generate integrated answers from the documentation arising from different versions. This can advantageously enable the users to more comfortably and easily use a greater scope of features or functions of a given software element, package, or platform. Moreover, the intelligent assistant is capable of embellishment of answers with appropriate images to produce a comprehensive and contextual multimodal response.

In additional examples, questions are categorized into expected response types, such as factoid and non-factoid responses. Factoid response models are based on machine reading comprehension models, where the models take in a suitable span of source material along with the question to arrive at the answer. Other examples also account for the conversational context of the question while generating the responses. An underlying assumption across these examples is the availability of passages containing an answer from which the model can extract an answer. However, in the case of documentation, such passages are not readily available. The examples herein can leverage these models along with a context-aware retrieval and passage ranking to build factoid answering capability in our assistant. For non-factoid answering, some examples merely select a suitable passage in its entirety as the answer to the question. However, merely extracting a passage does not always suffice to arrive a concise enough answer. Thus, the examples herein semantically group content across multiple passages to arrive at a more concise answer for a target question.

In addition to text-based documentation, images and pictures might be helpful in answering questions. When text and images are combined within answers, these answers are typically referred to as multimodal answers. Some examples handle visual searches by users, but effective multimodal answering to questions still have room for improvement. Documentation for software typically employs not only text-based descriptions but also images which comprise screenshots or user interface-centric images. Specifically, real-world images might comprise pictures of indoor scenes such as a those of a group of people watching TV together while having dinner or outdoor scenes such as a person playing volleyball on a beach. Different from these examples, the images encountered in documentation are typically scans of structured text, such as user interface tabs or dialog boxes.

The examples herein take any documentation corpus, with various versions along with added customizations to the documentation corpus, and provide assistance to users to better employ corresponding software. Examples include extracting a precise span of an answer within a paragraph of the documentation corpus, identifying and providing contextual factoid and non-factoid responses, and extracting relevant images, such as screenshots, to the questions to embellish the responses. Moreover, the examples herein are able to compare answers across various documentation versions and merge responses from multiple documentation versions. Such implementations as described herein can be of great value to complex software platforms, such as helping novice users ramp up their work faster, and can also help existing users to migrate across versions and customizations. Unlike a standard handling of questions and answers for documentation, the examples herein sit on top of the specific customer software installations to seamlessly switch among the customized documentation and the base documentation and to provide assistance for the exact software or documentation version that the user is presently employing.

Furthermore, the examples, herein are more flexible than existing solutions. For instance, existing examples work only separately for factoid and non-factoid question answering, but the examples herein provide a comprehensive mechanism to address both factoid and non-factoid in the same framework. The examples herein classify a user query as a factoid or non-factoid question and provide appropriate responses based on the identified nature of the question. Existing examples are explored in very restricted setups requiring large amount of manually curated data sets in the form of <passages, question, answers>. Curating such a dataset for documentation is a non-trivial task and cannot scale across different documentation customizations or versions. The examples herein leverage machine reading comprehension models and adapt them to a target documentation corpus, negating the need for a manually curated data set. This framework herein also scales well to new documentation corpus versions or customizations with minimal pre-processing. Such an approach also allows the intelligent assistant to be upgradeable and configurable for different documentation sources. The examples herein also provide responses that are embellished with relevant images to provide better information to the user. The lack of existing examples for screenshot or user interface category of images makes the examples herein particularly well suited to author assistance from a documentation corpus.

Some of the examples herein employ neural network based deep learning architectures to determine similarity among sentences and for passage formation. One such deep learning architecture, Bidirectional Encoder Representations from Transformers (BERT) is a deep learning architecture developed for natural language processing (NLP). Other deep learning architectures can be employed. BERT architectures typically provide context within bodies of text to searches, while older architectures typically don't provide context between words within bodies of text to searches. However, many BERT implementations only provide token-level or word-level searches. The examples herein system accept a question/query input and at least a portion of a documentation corpus into a BERT model that has been developed and trained for sentence-based structures. The sentence-based BERT-style of deep learning architecture employed herein is configured to output a tensor comprised of vector representations of each sentence. From this output, the examples herein determine a similarity of sentences of the documentation corpus to the various query terms. Sentence similarity cis then ranked and used for various response generation operations discussed herein.

The term documentation corpus refers to a set of documentation formed by text, text files, data files, media files, repositories, portable documentation, structured data files, annotations, changelogs, whitepapers, databases, or other data sources that describe function or operation of a target subject. Data files that comprise the documentation corpus are typically stored on one or more data storage systems, which might have a distributed or 'cloud' arrangement. The target subject might comprise any person, place, or thing that is described by a set of documentation. One example target subject might include software in the form of packages, platforms, systems, applications, operating systems, or other software types discussed herein. The target subject might instead be machinery, mechanisms, manufacturing systems, manufacturing processes, or other similar topics. The target subject might include computing platforms, data systems, hosting services, or deployment systems comprising various architectures and implementations. Questions or queries are posed by systems, software, or users/operators of such systems. As referred to herein, questions include requests, typically in one or more digital formats, that indicate a request for an answer to a particular topic. The questions might be received via user interfaces, or generated by automated systems and artificial intelligence systems. The user interfaces might include textual, command line, graphical, terminal, audio/visual, semantic, touch-based, or other types.

As discussed herein, passages comprise sub-portions of a documentation corpus which are determined by processing the documentation corpus itself for self-similarity among adjacent sentences. This inter-sentence similarity, as discussed below, determines break points between sets of text or images within a documentation corpus and used these break points to form groupings called passages. Passages each include sentences of the documentation corpus which are not only proximate in position within the documentation corpus but also cross a threshold in similarity among each other. Semantic clusters are formed from among a selected set of passages. Semantic clusters refer to groupings of sentences formed from sentences that are extracted from a selected set of passages. Semantic clusters rely in part on the concept of similarity probabilities or similarity scores, which rank sentences from among the selected set of passages. Similarity scores refer to a numerical indication of similarity to keywords in a query formed from a question. When used as a probability, these similarity scores refer to a probability that a particular sentence is relevant or related to keywords in a query. This probability are thus a numerical indicator of relevance.

FIG. 1 is presented as a first example system 100 that provides enhanced responses to questions drawn to a documentation corpus that describes operations and features of target software platforms or services. FIG. 1 includes user platform 110 and assistance platform 120, and documentation corpus 130. User platform 110 and assistance platform 120 communicate over communication link 150. User platform includes application 111, user interface 112, and assistance interface 114. Assistance platform 120 comprises at least a portion of an intelligent assistant and includes assistance service 121 and assistance interface 122. Assistance service 121 includes passage extraction element 123, passage ranking element 124, semantic clustering element 125, response generator element 126, and image embellishment element 127.

User platform 110 comprises a user device or user system that enables users to execute one or more applications or to enable users to interface with and manage various computing or content services. Documentation corpus 130 comprises one or more sets of documentation related to any target topic, such as operations and features of a computing service, content management service, content deployment software, or other software platforms and services. While application 111 might comprise a portion of the target software platform or service, application 111 might instead provide an interface for assistance with such target software platform or service. Portions of user platform 110 and assistance platform 120 might be included in similar software or hardware elements in some examples.

In operation, one or more questions are directed to subject matter of a documentation corpus 130, which in one example describes operations and features of target software platforms or services. These questions can be received over user interface 112 and provided by user platform 110 to assistance platform 120 via assistance interface 114 over link 150. These questions can also be provided over link 151. Assistance interface 122 receives these questions over any of links 150-151 and processes the questions to determine one or more responses 141. These responses can comprise factoid responses or non-factoid responses, which will be discussed below.

Figure 2:
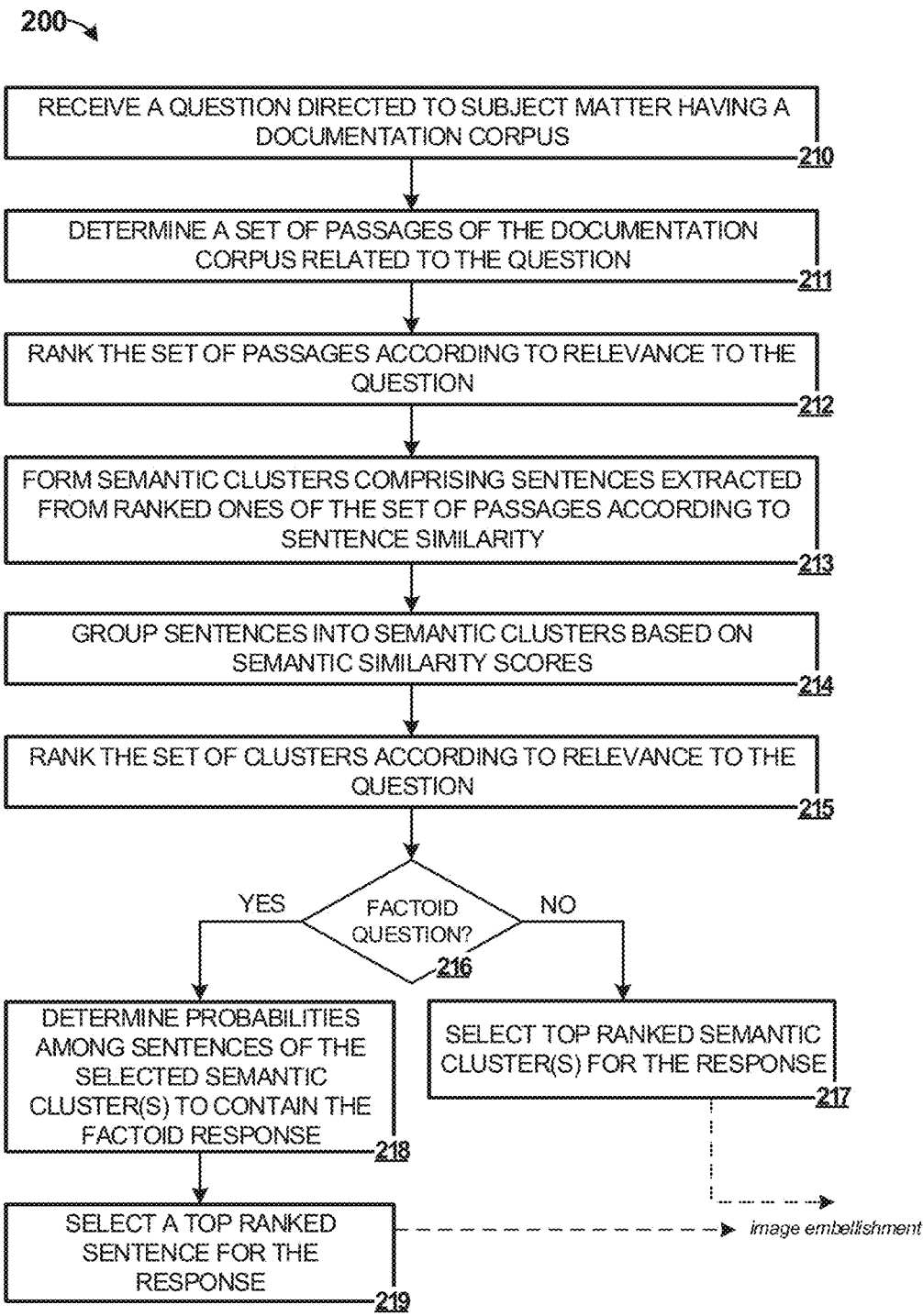
FIG. 2 illustrates operations of a user assistance system in an implementation.

For a more detailed operation of the elements of FIG. 1, several example operations 200 for an intelligent assistant are presented in FIG. 2. In FIG. 2, a documentation corpus is referenced. In this example, the documentation corpus includes various documentation related to a software package, software installation, software platform, applications, operating systems, virtualized environments, or other hardware or software elements. A customer installation of a software package might have a corresponding baseline set of documentation along with one or more additional sets of specialized documentation comprising customizations, versions, modules, revisions, updates, or other sets. The intelligent assistant seamlessly operates on the specialized documentation and the baseline documentation and provides assistance to related to an exact version a user employs. From every set of documentation, the intelligent assistant extracts portions of the resultant documentation corpus, such as the entire text of each page of the documentation sets. The documentation corpus is separated into passages prior to questions or responsive to questions. Images comprising graphical portions of the documentation corpus can be extracted from the text along with the surrounding text passages which can be used to determine 'meta' information about the images. These images can comprise any corresponding graphical representations, and may comprise screenshots of user interfaces in many examples of user-facing software package documentation.

With regard to the elements of FIG. 1, a user-provided question is first discussed. User platform 110 receives (210) a question via user interface 112 directed to a subject having a documentation corpus. User platform 110 is one example platform or portal for a user to interface with assistance platform 120. User interface 112 can be provided by application 111 executed on platform 110, and assistance interface 114 provides link 150 between user platform 110 and assistance platform 120 in one example. Other platforms or portals might comprise an interface to receive questions or indications of questions that are provided by assistance platform 120 over link 151, such as a remote user interface, web interface, network interface, virtual user interface, terminal interface, graphical user interface (GUI), or command line interface (CLI), among other interface types.

Questions are categorized as factoid or non-factoid. Factoid questions are formulated to expect a terse or compact response, such as questions asking 'yes/no', 'what', or simple 'how' type questions. Non-factoid questions relate to longer explanatory answers, such as a series or sequence of steps, requests for instructions, questions covering more complex 'how' and 'why' questions, or verbose explanations. In the examples herein, both factoid and non-factoid share several processing steps. The examples herein provide a comprehensive mechanism to address both types of questions in the same framework, instead of separate processes for each. Factoid responses can be generated from certain results of the shared processing. A determination of a whether a question is a factoid question or a non-factoid is relevant later in the operations of Figure (e.g. operation 216), but can also be used in other operations. Assistance interface 122 or response generator 126 of assistance service 121 determines if a question comprises a factoid or non-factoid type of question based at least on heuristic processing. The examples herein classifies a question as a factoid or non-factoid question and then, according to the operations discussed herein, provides appropriate responses based on the identified nature of the question.

However, once a question is issued, an indication of the question, such as question 140, is provided to assistance platform 120 over one or more among links 150 or 151 for receipt by assistance interface 122. Assistance interface 122 includes a question handler to form one or more queries from questions and maintain context for current questions based on prior questions. Assistance interface 122 might transfer an indication of the question to further elements in assistance service 121, or assistance interface 122 itself can process the question. If there are previous questions from the same conversation session, content from these previous questions can be combined with the current question to understand the context of the question and re-formulate a contextually enhanced question. A moving window of previous questions can be maintained to compute a contextually enhanced question. It should be understood that there may be no prior questions for some sessions, and any contextual processing might then be bypassed. Assistance interface 122 can append more than one of the questions in the current window to the current question and resolve co-references among current and prior questions in a combined question. The combined question (after co-reference resolution) allows the intelligent assistant to understand a context of the current question in a current conversation context. Assistance interface 122 or passage extraction element 123 uses the combined question to construct a query and issue the query against documentation corpus 130 and retrieve a set of documents related to the combined question. Some examples might have the entire documentation corpus retrieved.

Passage extraction element 123 determines (211) of a set of passages of documentation corpus 130 related to the combined question using the query. As noted above, the query retrieves relevant documents comprising text or images from documentation corpus 130 and then passage extraction element 123 segregates the documents and text into passages. In one instance, these passages are established using local coherence to identify separate subjective passages from the documents. Consecutive sentence similarities can be employed to determine the local coherence, where an inter-sentence similarity score or value is determined among each set of consecutive sentences. Passage extraction element 123 employs local coherence to split the retrieved documents into passages by establishing break points where the inter-sentence similarity is less than a threshold level, score, or value. Passage extraction element 123 might employ cosine similarity, among other similarity techniques, between universal sentence encodings-based embedding to arrive at inter-sentence similarity.

Figure 4:
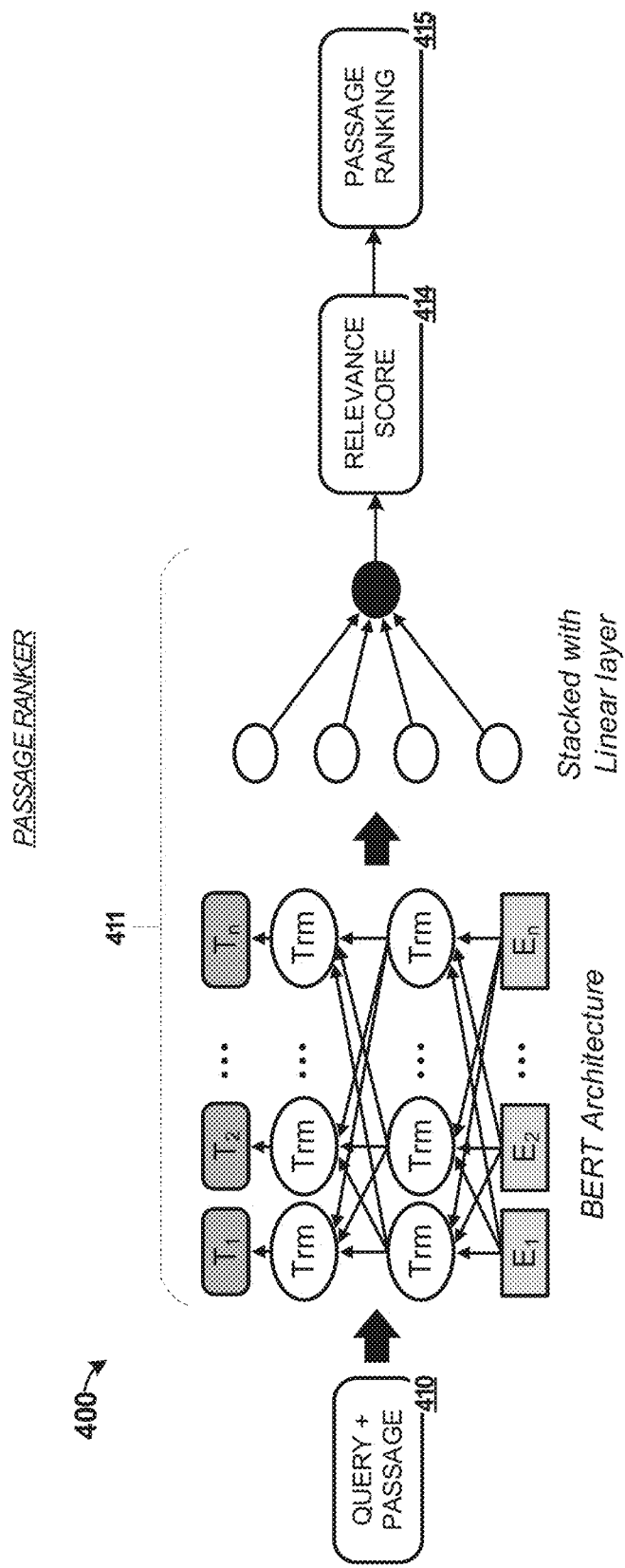
FIG. 4 illustrates an artificial neural network system in an implementation.

Once the retrieved documents are broken into passages, each passage receives a ranking to determine relevance to the question (or combined question if context is employed). Passage ranking element 124 ranks (212) the set of passages according to relevance to the question. The passages are ranked based on their relevance to the question and the top ranked passages are noted. In some examples, a set of the top three ranked passages are employed for further processing, although this quantity can vary. Passage ranking element 124 might rank the passages thus identified based on relevance to the question using a Bidirectional Encoder Representations from Transformers (BERT) based passage ranker architecture. FIG. 4 illustrates one example BERT-based passage ranking framework, and will be discussed in more detail below. In such examples, passage ranking element 124 uses a BERT architecture/model trained on a large set of query-passage pairs. The BERT architecture, once trained, provides a probability of a given passage being relevant to the question. Passage ranking element 124 computes this probability independently for each passage and ranks the final list of passages with respect to their relevance probabilities. Passage ranking element 124 can also compare probability results across various documentation sources, versions, or customizations and such, and merge responses from documentations.

At this point, a top ranked full passage might be provided as a possible answer to the question. However, this possible answer might be inaccurate or not ideal for a user to determine the actual answer. Moreover, this possible answer might not capture the extent of the answerable content within the entirety of documentation corpus 130. This can be due to the answer extending across multiple passages of documentation corpus 130, or buried within a very large passage. Thus, to provide a more accurate and useful answer to a user, a semantic clustering-based answer construction is provided. This semantic clustering-based answer is especially useful in constructing verbose answers to certain types of questions.

However, before the response (factoid or non-factoid) is determined, semantic clustering element 125 is used to form (213) semantic clusters based on processing a set of ranked passages. The ranked passages were determined in operation 212 above, and these semantic clusters comprise sentences extracted from among ranked ones of the set of passages according to sentence similarity. For questions categorized as non-factoid, semantic clustering element 125 uses a set of top ranked passages, such as the top three (3) ranked passages, determined by passage ranking element 124 and tokenizes the set of top ranked passages into sentences. Semantic clustering element 125 computes sentence encodings of each of the sentences by using a transformer-based sentence encoding and computes a semantic similarity of adjacent sentences. Semantic clustering element 125 computes the sentence semantic similarity scores using cosine similarity between sentence encodings, among other techniques. Semantic clustering element 125 places sentences into a same cluster if their sentence semantic similarity scores cross a sentence similarity score threshold. If the score is less than the threshold, a sentence is put into a different cluster. This clustering process is repeated across all of the sentences of the set of top ranked passages, and results in groupings of sentences in the set of top ranked passages into semantic clusters. This clustering process advantageously provides for combining sentences found among different passages into a single semantic cluster, with many such semantic clusters possible.

After the semantic clusters are formed, semantic clustering element 125 re-ranks these semantic clusters based on the relevance to the query or question using a similar or same BERT model found in passage ranking element 124 and from operation 212. From this re-ranking using semantic clusters, cluster similarity scores as related to the query/question can be determined. If the top ranked semantic clusters have cluster similarity scores to the query/question above a cluster similarity score threshold, then the probability of relevance of the top ranked semantic clusters is sufficient to provide in an answer or response. When the question comprises a non-factoid type question (216), then a non-factoid response can comprise one or more selected (e.g. top-ranked) semantic clusters which exceed the cluster similarity score threshold. Response generator element 126 generates and provides (217) a non-factoid response to the question based at least on this selected semantic cluster. For non-factoid response generation, response generator element 126 extracts and groups similar sentences from top ranked passages to create candidate answers and then uses these candidate answers to generate a final response for transfer to a user.

For factoid types of questions, response generator element 126 determines (218) probabilities to contain a factoid style of response among sentences of the one or more selected (e.g. top-ranked) semantic clusters which exceed the cluster similarity score threshold. The selected semantic clusters along with the question are processed by response generator element 126 to rank sentences. From this ranking an appropriate text span within the selected semantic clusters is selected to generate a final factoid response for a user. This text span will typically comprise a sentence with a selected clustered passage. Response generator element 126 selects (219) a top ranked sentence for the factoid response.

In addition to the textual answers found in operations 217 or 219, additional information can be provided with a response. This additional information might comprise one or more graphics or images extracted from the documentation corpus that comprise information relevant to the question and embellish the final response. Frequently, documentation for software or similar topics includes screenshots of user interfaces to show operations and locations of interface elements or functions. Concurrent with the processing of the question against the documentation corpus and text and response generation, image embellishment element 127 determines relevant images from pages within documentation corpus 130 which contain the final response. Images that are proximate, nearby, or on similar pages as the text selected for the response are determined for relevance to the responses. A relevance determination similar to those performed in other operations is performed, or a different scoring mechanism might be employed. Image embellishment element 127 processes metadata associated with the images, such as at least one among headings, captions, titles, and text, structure, or interface elements within the images or associated with the images to determine similarity scores to proximate text of the passages. Optical character recognition (OCR) might be performed on the images to determine text within the images, or other structural and formatting metadata. If at least one image in related text of documentation corpus 130 is above a similarity threshold to the semantic cluster or sentence selected for the final response, then image embellishment element 127 selects the at least one of the images to provide to response generator element 126 for embellishment the final response with the corresponding images. Further operations on image embellishment are discussed in FIG. 7.

Figure 3:
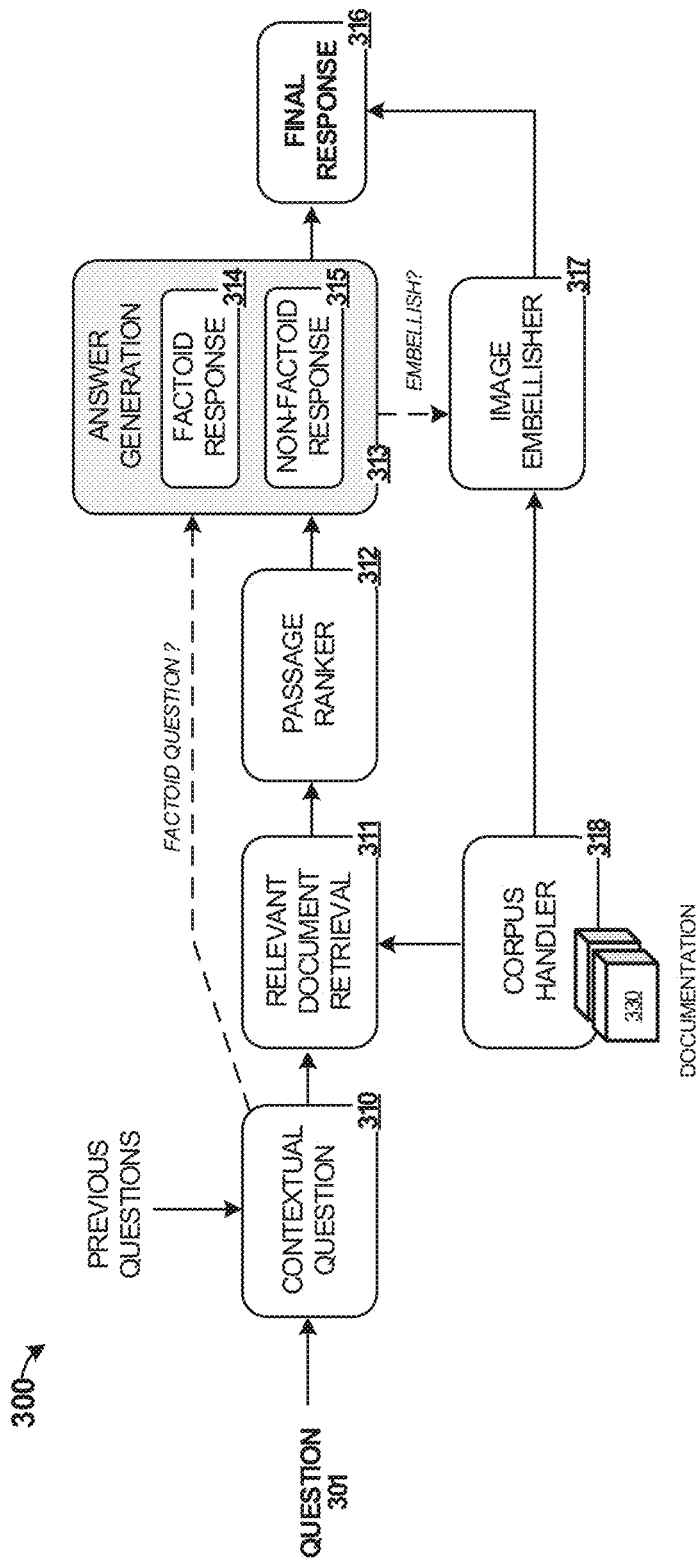
FIG. 3 illustrates operations of a user assistance system in an implementation.

FIG. 3 illustrates example assistance service 300 that includes operations and elements of a user assistance system in an implementation. In FIG. 3, documentation corpus 330 is included, and questions can be drawn to topics and content covered by documentation corpus 330. From every version, customization, etc., of documentation within documentation corpus 330, corpus handler 318 extracts text of each page of the documentation and then breaks each page into different passages. Corpus handler 318 extracts images in the documentation along with indications of the surrounding passages which are used to extract meta information about the images. Corpus handler 318 might pre-process documentation corpus 330 before questions are received, or might process documentation corpus 330 in response to questions. Passages comprise strings of text, and when documentation corpus 330 (or a portion thereof) is broken into passages, the result comprises a list of strings. To break the document into passages, corpus handler 318 uses the notion of local coherence from to identify passages from the document. Consecutive sentence relations or similarities might be used to determine the local coherence, along with an additional splitting of documentation corpus 330 into passages by breaking documentation corpus 330 at points where inter-sentence similarity is less than a threshold similarity. Corpus handler 318 employs cosine similarity between universal sentence encodings-based embedding to arrive at the inter-sentence similarity.

Question 301 is received into assistance service 300. Element 310 determines if question 301 is associated with any previous questions, such as from the same session or within a predetermined timeframe. If there are previous questions from same conversation session, these previous questions are combined with the current question to understand the context of the question and re-formulate a contextual question. These previous questions can be stored for use as context for later questions. Element 310 contextualizes question 301 using the previous questions, or results obtained for the previous questions. This contextualization might include focusing any query and document retrieval to particular portions of documentation corpus 330, or to aid in more accurate ranking of results obtained by passage ranking or other ranking processes.

Element 310 determines if question 301 comprises a factoid type of question or non-factoid type of question. This determination can be useful in later operations in FIG. 3, as well as to further contextualize question 301. Element 310 produces a contextual question based on question 301 and one or more previous questions, along with other contextual information. This contextual question is provided to elements 311 or 313 for documentation retrieval and response generation. In the field of linguistics, factoid questions typically are either a yes/no type of question or a what/how type of question. Using this basis, element 310 heuristically classifies the current question as factoid or non-factoid. For example, if the question starts with words like "is", "does", or "in" element 310 classifies it as a factoid question. A "what" style of question with at least one noun phrase can also be classified as a factoid question. Similarly, a "how" type of question with only an adjective can be classified as a factoid question. All other questions are classified as non-factoid type of questions.

Element 311 determines a query based on the contextual question provided by element 310. This query includes keywords and phrases along with logical operators to retrieve portions of documentation corpus 330 for further processing. Element 311 extracts keywords from the contextual question to construct the query. Element 311 uses the query, once constructed, to retrieve all relevant documents or portions from documentation corpus 330. These relevant portions might be broken into passages already by corpus handler 318, or corpus handler 318 might break the relevant documents or portions into passages responsive to the current question. Element 311 retrieves portions of documentation corpus 330 in the form of passages, which comprise portions of documentation corpus 330 related to the query. Element 311 provides these passages to element 312 for passage ranking. Element 312 then ranks the passages retrieved by element 311 according to relevance to the query, current question, or contextual question. A set of top-ranked passages, such as three or more passages, is then used for further processing. One example of passage ranker 312 is illustrated in FIG. 4, and will be discussed below.

Figure 5:
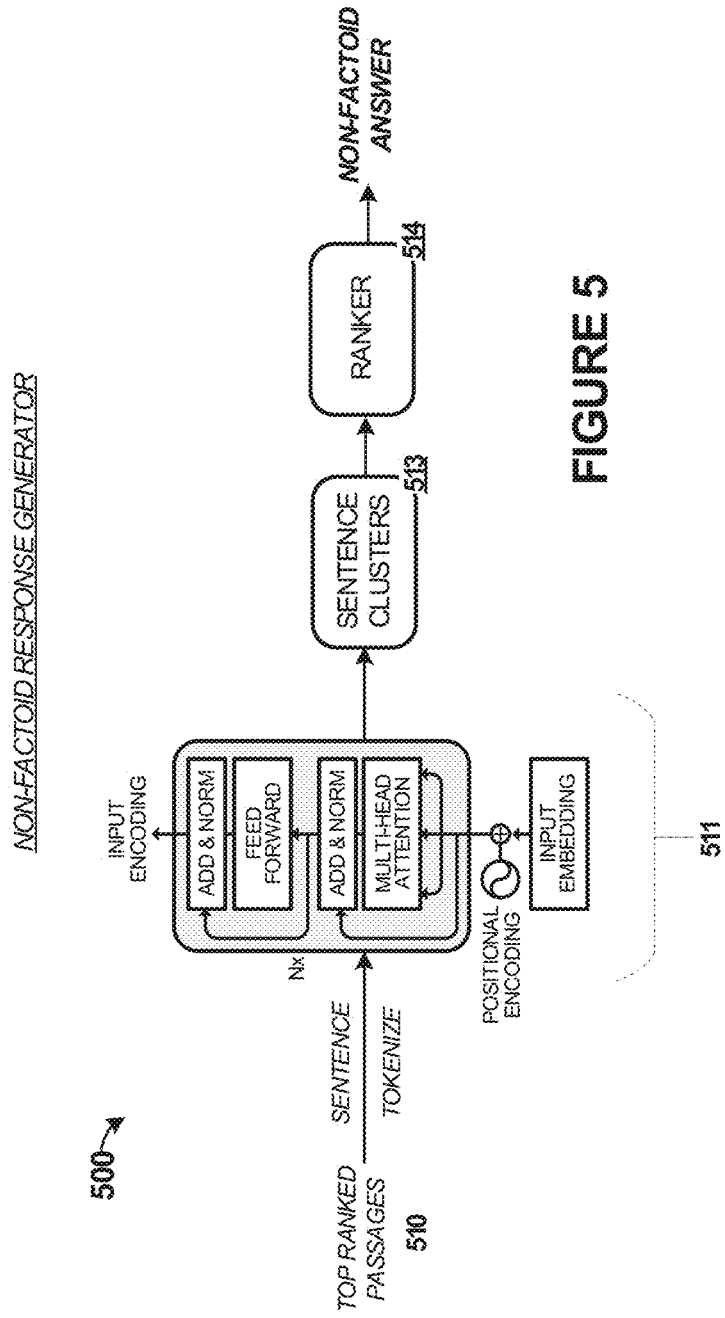
FIG. 5 illustrates response generation operations in an implementation.

Once a set of ranked passages are determined by element 312, this set of ranked passages is provided to answer generation element 313. Answer generation element 313 comprises factoid response element 314 and non-factoid response element 315. The type of question initially received is determined to be a factoid or non-factoid question. Element 310 performs such question type determination operations, along with other portions of assistance service 300. Answer generation element 313 uses the determination of the question type and produces an appropriate answer type or response type. FIG. 5 below illustrates non-factoid response generation, while FIG. 6 below illustrates factoid response generation.

Final response element 316 produces response that includes a non-factoid response or factoid response. Both factoid and non-factoid answers can be produced from text of a documentation corpus and one or more input questions. However, the responses or answers provided can also incorporate one or more images which were included in the documentation corpus. Image embellisher 317 provides selected images for inclusion in the responses produced by final response element 316. Final response element 316 produces and transfers a final response to the user that includes final response (factoid or non-factoid) as well as one or more embellishment images that exceeded the threshold score.

Turning now to FIG. 4, passage ranker 400 is included as an example of passage ranker 312 of FIG. 3 or passage ranking element 124 of FIG. 1, although variations are possible. Passage ranker 400 includes a BERT architecture that generates a relevance score for passages. This relevance score can be used to rank the passages from most relevant to least relevant. Query and passage data 410 is input to BERT architecture 411 for relevance determination. The passages are each ranked based on their relevance to the query and the top ranked passages are noted. Passage ranker 400 can employ BERT architecture 411 trained on a large set of query-passage pairs. BERT architecture 411 can be trained using an adaptive learning rate optimization algorithm, such as an ADAM optimization among others, which can adapt the learning rate for each weight of BERT architecture 411. BERT architecture 411 begins training from a pre-trained or baseline BERT model and can be fine-tuned to the passage ranking task using cross-entropy loss noted by:

$$L = -\sum_{j \in Jpos} \log(Sj) - \sum_{j \in Jneg} \log(1 - Sj)$$

In the above formula, Jpos represents the set of indexes of the relevant passages and Jneg represents the set of indexes of non-relevant passages in top-1,000 documents retrieved. The BERT model, once trained, provides a relevance score 414 (noted as a probability) of a given passage being relevant to the query. BERT architecture 411 computes this probability independently for each passage and ranks the final list (415) of passages with respect to their relevance probabilities. BERT architecture 411 can also compare probability results across various documentation sources, versions, or customizations and such, and merges responses from documentations.

Figure 6:
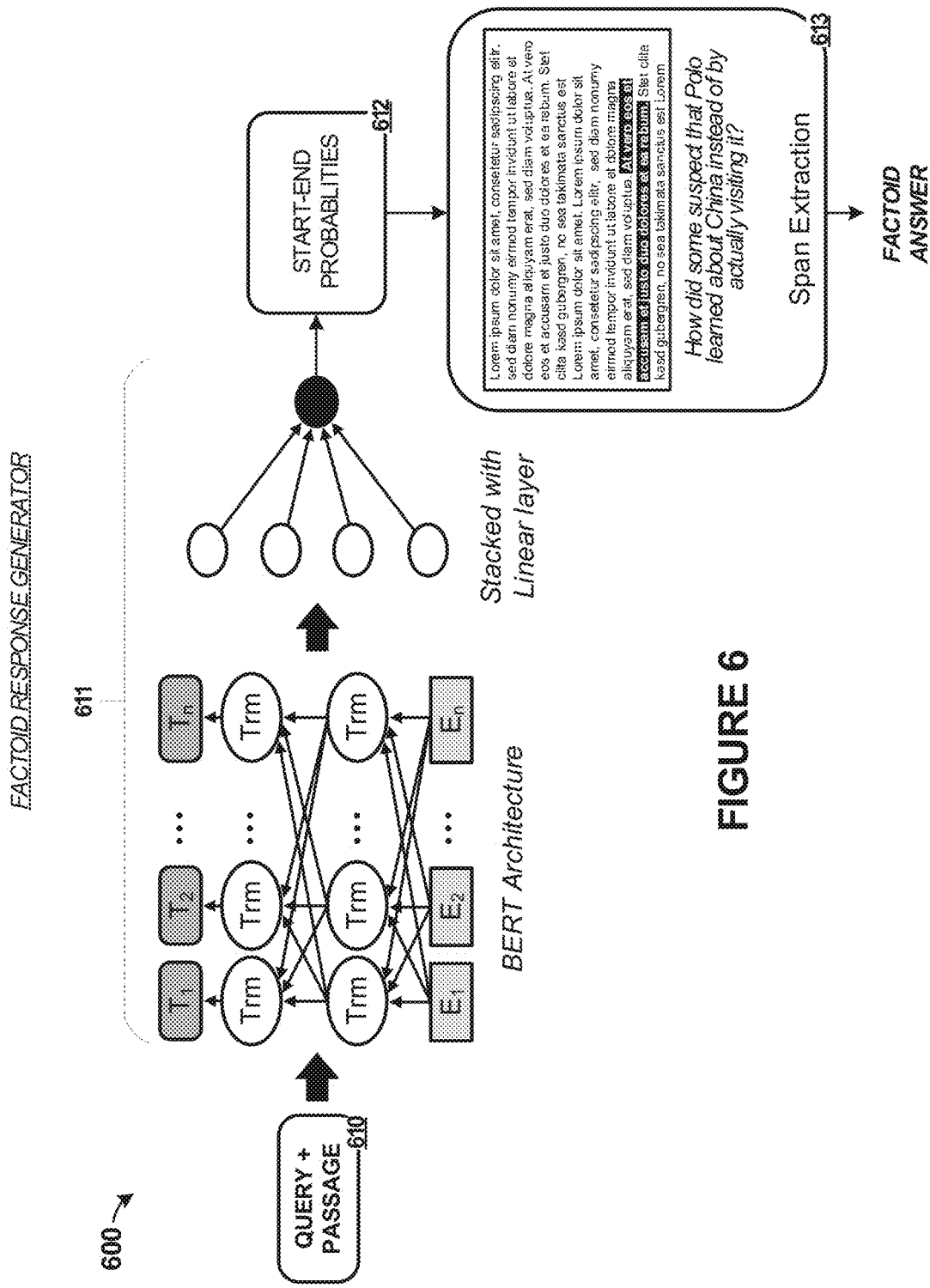
FIG. 6 illustrates response generation operations in an implementation.

FIG. 5 illustrates non-factoid response generation, while FIG. 6 illustrates factoid response generation.

Turning first to non-factoid responses, FIG. 5 shows non-factoid response generator element 500. Element 500 can be an example of non-factoid response element 315 of FIG. 3 or of portions of response generator element 126 of FIG. 1, although variations are possible. Some examples for non-factoid response generation use an input question to rank the passages in a corpus and return the top relevant passages as the final answer. However, this particular example has limitations in that the answer typically cannot extend over multiple passages or encompass different documentation sources, versions, or customizations. The example in FIG. 5 employs semantic clustering to produce non-factoid responses, and can also use semantic clustering to seed operation of factoid responses.

For questions categorized as non-factoid, element 500 takes a set of top ranked passages 510 from passage ranger 312 (or passage ranker 400) and tokenizes these passages into pieces according to sentence breaks. The top three (3) ranked passages might be selected for tokenization, although other quantities than three might instead be selected. Semantic clustering element 511 computes sentence encodings of each of the sentences in the set of passages by using a transformer-based sentence encoding module and computes a semantic similarity among adjacent sentences by using cosine similarity between their sentence encodings. Semantic clustering element 511 places sentences into the same cluster of sentences if the similarity score crosses a predefined threshold value. If the similarity score is less than the threshold value, the corresponding sentence is put into a new cluster of sentences. Semantic clustering element 511 repeats this process across all the sentences of the set of ranked passages. This operation results in individual sentences among the top ranked passages grouped into semantic clusters. Individual sentences from among the top ranked passages can be extracted from the respective passages and formed into groups comprising the semantic clusters. This allows combining answers from different passages into a single semantic cluster, and several such semantic clusters 513 can be determined from among the top ranked passages.

Ranker 514 then re-ranks these semantic clusters based on the relevance to the query. After ranking, if the top ranked semantic clusters identified are within a threshold probability of relevance to the question, then selected ones among these semantic clusters can be employed as the final non-factoid response.

Turning next to factoid responses, factoid response generator element 600 is shown in FIG. 6. Element 600 can be an example of factoid response element 314 in FIG. 3 or portions of response generator element 126 of FIG. 1, although variations are possible. For questions categorized as factoid, element 600 receives a set of top ranked passages 610 and the associated query from a passage ranger. Some examples for factoid response generation only require a relatively short text string to search for a target answer among a corpus. However, such a short text string is not typically available based on questions. Instead, element 600 employs at least a portion of the previously discussed non-factoid pipelines (such as in FIG. 5) to identify a top semantic cluster of sentences. This semantic cluster is then used as an input string or passage to a factoid processing pipeline comprising BERT architecture 611. BERT architecture 611 might comprise similar elements, training, or models as employed for BERT architecture 411. However, BERT architecture 611 might instead use BERT architecture 411 from FIG. 4 as a baseline and modify the BERT classification framework to build a factoid answer generation module. A recent dataset can be employed as our ground truth training data for BERT architecture 611. The dataset consists of triples of question along with the passage containing and answer and a span indicating the answer in the passage. Now, a mask is built to the input passages using the span information and train BERT architecture 611 to identify the masked part of the passage as the answer. Once BERT architecture 611 is trained, element 600 uses BERT architecture 611 along with an input semantic cluster to predict the start and end (612) span of a factoid answer within the semantic cluster. A sentence containing the span is extracted (613) as the final factoid response.

Figure 7:
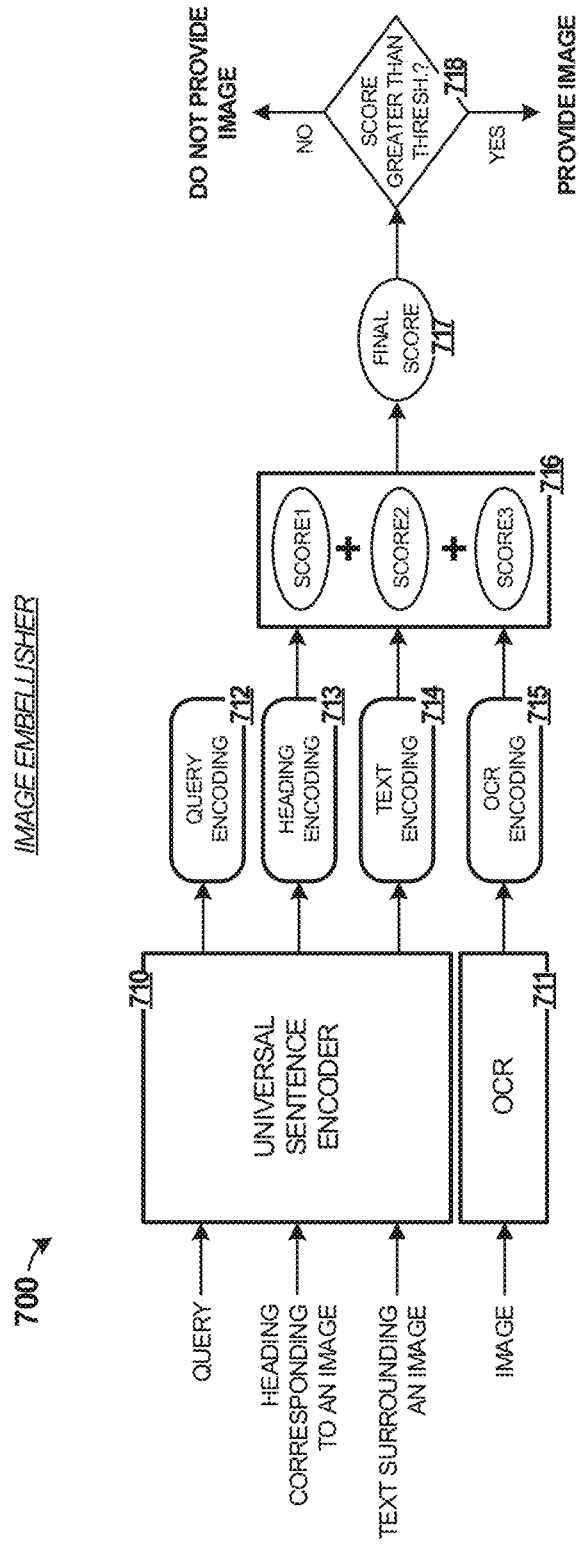
FIG. 7 illustrates image embellishment of for response operations in an implementation.

FIG. 7 illustrates a detailed example of image embellishment, which might comprise portions of image embellisher 317 of FIG. 3 or image embellishment element 127 of FIG. 1, although variations are possible. FIG. 7 includes image embellisher element 700. Element 700 embellishes final responses with one or more appropriate images if the one or more images exceed a threshold of relevance. This embellishment can better help illustrate the text provided in a final response. Typically, images that are present in documentation corpuses for software platforms are screenshots of user interfaces, unlike other types of images of landscapes, art, photographs, memes, and the like found across the Internet at large.

As mentioned above, element 700 embellishes final responses with appropriate image if images are found in the documentation corpus that are relevant to the question. Element 700 processes images included in documents or files from which the final top ranked semantic clusters are found. A corpus handler, such as corpus handler 318 in FIG. 3, can pre-process a documentation corpus to determine the images as well as various metadata corresponding to the image. This metadata can include headings, text surrounding images, content found within the images, and other metadata. This metadata, along with the current query is input to universal sentence encoder 710. The images might be processed using OCR techniques in OCR element 711 to determine text included within the images.

Universal sentence encoder 710 and OCR element 711 produce various encodings of the image, metadata, and query, such as query encoding 712, heading encoding 713, surrounding text encoding 714, and OCR encoding 715. For headings, universal sentence encoder 710 extracts the sentence encoding of the heading or title proximate to the image that is present in the documentation. This heading encoding 713 can provide a representative of the key concept expressed by the current image. For surrounding text, universal sentence encoder 710 extracts the sentence encoding of the surrounding text of the images since the surrounding text can contain information regarding the images. This surrounding text encoding 714 can provide a representative of the context of the images. The images are processed by OCR element 711 to extract bag-of-words representations of various words in the images. OCR element 711 takes a weighted average of the Global Vectors (GloVe) embeddings of these words in the ratio of their inverse term frequencies of the corresponding words in the documentation corpus. OCR element 711 uses the inverse term frequencies to reduce the noise in the words that we obtain from OCR. This provides a representation of the concepts present in the images, and is employed to understand if concepts are relevant to concepts in the final response. Universal sentence encoder 710 also computes a cosine similarity (having a similarity value of −1 to +1) of the query or contextual question to the images by using the sentence encoding and average GloVe embeddings of the query/question with the embeddings extracted as query encoding 712.

From these various encodings 712-715, image scorer 716 determines scores (1-3) indicating relevance to the final response. Image scorer 716 computes a weighted average of all the scores to arrive at a final image relevance score 717 to the final response. If score 717 exceeds a threshold score (718), then the final response is embellished with the corresponding images.

Figure 8:
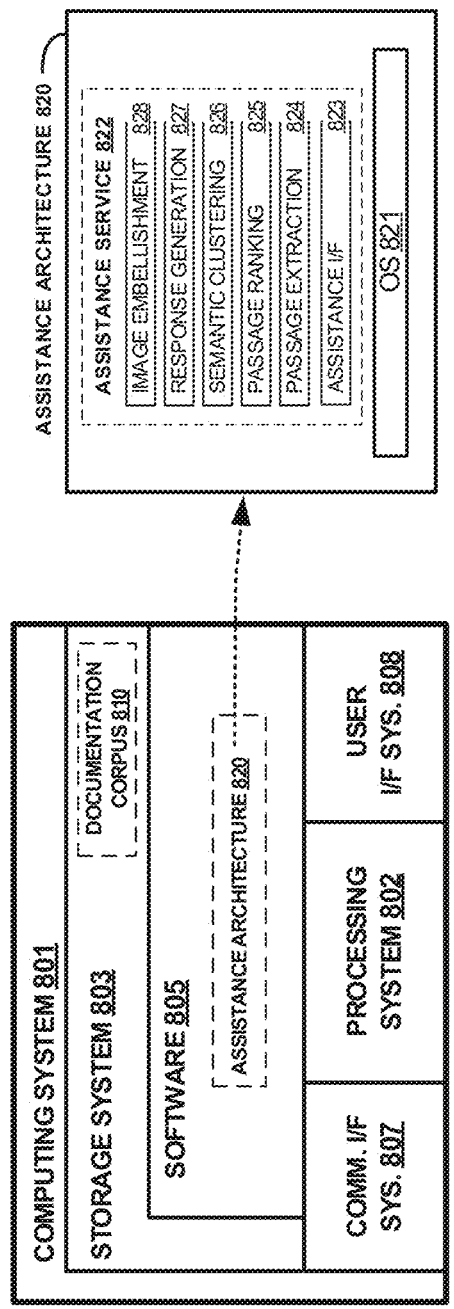
FIG. 8 illustrates a computing system to host or control a user assistance system according to an implementation.

FIG. 8 illustrates computing system 801 to host or control a user assistance system according to an implementation. FIG. 8 illustrates computing system 801 that is representative of any system or collection of systems in which the various operational architectures, services, platforms, scenarios, and processes disclosed herein may be implemented. For example, computing system 801 can be used to implement elements of any of the assistance platforms or assistance services discussed herein, such as user platform 110, application 111, assistance interface 114, assistance platform 120, or assistance service 121 of FIG. 1, and assistance service 300 of FIG. 3.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 808. Processing system 802 is operatively coupled with storage system 803, communication interface system 807, and user interface system 808. Examples of computing system 801 include, but are not limited to, computer servers, cloud computing systems, web servers, user assistance interface systems, user devices, distributed computing systems, software-defined networking systems, computers, desktop computers, hybrid computers, rack servers, web servers, cloud computing platforms, and data center equipment, as well as any other type of physical or virtual server or computing machine, and other computing systems and devices, as well as any variation or combination thereof.

Processing system 802 loads and executes software 805 from storage system 803. Software 805 includes assistance architecture 820, which is representative of the processes, services, and platforms discussed with respect to the included Figures. When executed by processing system 802 to provide responses to questions from among a documentation corpus, among other services, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a microprocessor and processing circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing various deep learning architectures, question processing elements, and response generation to questions from among a documentation corpus, among other services. The program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include assistance architecture 820. Software 805 may also comprise firmware or some other form of machine-readable processing instructions executable by processing system 802.

Software 805 may, when loaded into processing system 802 and executed, transform a suitable apparatus, system, or device (of which computing system 801 is representative) overall from a general-purpose computing system into a special-purpose computing system customized to provide responses to questions from among a documentation corpus, among other assistance services. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors. For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Assistance architecture 820 includes one or more software elements, such as OS 821 and assistance service 822. Assistance service 822 can include assistance interface 823, passage extraction element 824, passage ranking element 825, semantic clustering element 826, response generation element 827, and image embellishment element 828, among others.

Assistance interface 823 can receive an indication of a question directed to a subject having a documentation corpus, indicated by documentation corpus 810 in FIG. 8. Documentation corpus 810 can be stored within storage system 803, or can be stored across other storage systems, including distributed or cloud storage services. Assistance interface 823 can contextualize the question against documentation corpus 810 based on at least one previous question directed to documentation corpus 810, and can determine whether the question corresponds to a factoid response or a non-factoid response.

Passage extraction element 824 forms a query comprising keywords based on the question, and determines a set of passages of documentation corpus 810 related to the question. Based on the query, passage extraction element 824 can process the documentation corpus with a neural network that indicates at least the set of the passages as relevant to the keywords along with relevance probabilities of the set of the passages. Passage extraction element 824 processes similarity across consecutive sentences to determine inter-sentence similarity metrics, determines the passages in the documentation corpus as groupings among the consecutive sentences based on the inter-sentence similarity metric exceeding a similarity threshold, and determines break points between the passages based on the inter-sentence similarity falling below the similarity threshold among the consecutive sentences. Passage ranking element 825 can then rank the set of passages according to relevance to the question, such as using a BERT architecture.

Semantic clustering element 826 forms semantic clusters comprising sentences extracted from ranked ones of the set of passages according to sentence similarity. Based on the question corresponding to a non-factoid response, semantic clustering element 826 tokenizes the set of the passages into the sentences, computes semantic similarity scores among the sentences of the set of the passages, groups the sentences into associated ones of the semantic clusters based on the semantic similarity scores, and ranks the semantic clusters according to relevance to the question; and selecting a top ranked semantic cluster to provide in the response. Based on the question corresponding to a factoid response, similar operations are as performed by semantic clustering element 826 for a non-factoid question are performed. In addition, semantic clustering element 826 processes the selected semantic cluster with a neural network having inputs as the selected semantic cluster and keywords determined from the question, where the neural network indicates at least probabilities among sentences of the selected semantic cluster to contain the factoid response. Based on the probabilities, semantic clustering element 826 selects at least one among the sentences of the selected semantic cluster as the factoid response.

Response generation element 827 provides a response to the question based at least on a selected semantic cluster. Specifically, for non-factoid questions, the selected semantic cluster is provided in the final answer. For factoid questions, the selected semantic cluster is used to seed a further factoid extraction process, where the factoid response is extracted from among at least the selected semantic cluster. Thus, response generation element 827 provides the response to the question to supply the factoid response or the non-factoid response.

Image embellishment element 828 discovers images within the documentation corpus, processes at least one among headings, captions, titles, and optical character recognition (OCR) results associated with the images to determine similarity scores to proximate ones of the passages that contain the selected semantic cluster, and similarity scores for text surrounding the selected passages, and the query or question, among other similarity scores. Image embellishment element 828 selects at least one of the images having a similarity score above a threshold to the selected semantic cluster, and provides the at least one of the images to response generation element 827 for inclusion with the response to the question.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 807 can receive questions issued by users or operators and provide responses to the users or operators.

Communication between computing system 801 and other computing systems (not shown), may occur over a communication network or networks and in accordance with various communication protocols, combinations of protocols, or variations thereof. For example, computing system 801 when implementing a server, might communicate with a user device. Examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc. . . . ), the transmission control protocol (TCP), and the user datagram protocol (UDP), as well as any other suitable communication protocol, variation, or combination thereof.

User interface system 808 may include a keyboard, a mouse, a voice input device, a touch input device for receiving input from a user. Output devices such as a display, speakers, web interfaces, terminal interfaces, and other types of output devices may also be included in user interface system 808. User interface system 808 can provide output and receive input over a network interface, such as communication interface system 807. In network examples, user interface system 808 might packetize display or graphics data for remote display by a display system or computing system coupled over one or more network interfaces. User interface system 808 may comprise application programming interface (API) elements for interfacing with users, other data systems, other user devices, web interfaces, and the like. User interface system 808 may also include associated user interface software executable by processing system 802 in support of the various user input and output devices discussed above. Separately or in conjunction with each other and other hardware and software elements, the user interface software and user interface devices may support a console user interface, graphical user interface, a natural user interface, or any other type of user interface.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. A method comprising:
   receiving a user question directed to a subject having a documentation corpus;
   determining a set of passages of the documentation corpus related to the user question;
   ranking the set of passages according to relevance to the user question;
   forming semantic clusters of sentences extracted from one or more top ranked passages of the set of passages according to sentence similarity;
   determining a classification of whether the user question corresponds to a factoid response or a non-factoid response; and
   providing a response to the user question based at least on a selected semantic cluster and the classification.

2. The method of claim 1, further comprising:
   contextualizing the user question against the documentation corpus based on at least one previous user question directed to the documentation corpus.

3. The method of claim 1, further comprising:
   processing similarity across consecutive sentences to determine an inter-sentence similarity metric;
   determining the passages in the documentation corpus as groupings among the consecutive sentences based on the inter-sentence similarity metric exceeding a similarity threshold; and
   determining break points between the passages based on the inter-sentence similarity metric falling below the similarity threshold among the consecutive sentences.

4. The method of claim 1, further comprising:
   forming a query comprising keywords based on the user question;
   based on the query, processing the documentation corpus to determine local coherence to indicate at least the set of passages as relevant to the keywords along with relevance probabilities of the set of passages.

5. The method of claim 1, further comprising, based on determining that the user question corresponds to the non-factoid response:
   tokenizing the set of passages into the sentences; computing semantic similarity scores among the sentences of the set of passages; grouping the sentences into associated ones of the semantic clusters based on the semantic similarity scores; ranking the semantic clusters according to relevance to the user question; and selecting a top ranked semantic cluster as the selected semantic cluster to provide in the response.

6. The method of claim 1, further comprising, based on determining that the user question corresponds to the factoid response: processing the selected semantic cluster with a neural network having inputs representing the selected semantic cluster and keywords determined from the user question to generate probabilities that sentences of the selected semantic cluster contain the factoid response; and based on the probabilities, selecting at least one among the sentences of the selected semantic cluster as the response.

7. The method of claim 1, further comprising:
   discovering images within the documentation corpus;
   processing at least one among headings, captions, titles, and optical character recognition (OCR) results associated with the images to determine similarity scores to proximate ones of the passages;
   selecting at least one of the images each having a corresponding one of the similarity scores within a threshold similarity to the selected semantic cluster; and
   providing the at least one of the images with the response to the user question.

8. One or more computer storage media storing computer-useable instructions that, when used by one or more computing devices, cause the one or more computing devices to perform operations comprising:
   receiving a user question associated with a documentation corpus;
   determining a set of passages from the documentation corpus related to the user question;
   employing a neural network to rank the set of passages according to relevance to the user question;
   forming semantic clusters of sentences extracted from one or more top ranked passages of the set of passages according to sentence similarity;
   determining a classification of whether the user question corresponds to a factoid response or a non-factoid response; and
   producing a response to the user question based at least on a selected semantic cluster and the classification.

9. The one or more computer storage media of claim 8, the operations further comprising contextualizing the user question against the documentation corpus based on at least one previous user question directed to the documentation corpus.

10. The one or more computer storage media of claim 8, the operations further comprising:
    processing similarity across consecutive sentences to determine an inter-sentence similarity metric;
    determining the passages from the documentation corpus as groupings among the consecutive sentences based on the inter-sentence similarity metric exceeding a similarity threshold; and
    determining break points between the passages based on the inter-sentence similarity metric falling below the similarity threshold among the consecutive sentences.

11. The one or more computer storage media of claim 8, the operations further comprising processing the documentation corpus to determine local coherence to indicate at least the set of passages as relevant to keywords along with relevance probabilities of the set of passages.

12. The one or more computer storage media of claim 8, the operations further comprising, based on the classification being that the user question correspond to the non-factoid response: tokenizing the set of passages into the sentences; computing semantic similarity scores among the sentences of the set of passages; grouping the sentences into associated ones of the semantic clusters based on the semantic similarity scores; ranking the semantic clusters according to relevance to the user question; and selecting a top ranked semantic cluster as the selected semantic cluster to provide in the response.

13. The one or more computer storage media apparatus of claim 8, the operations further comprising, based on the classification being that the user question corresponds to the factoid response: processing the selected semantic cluster with the neural network having inputs representing the selected semantic cluster and keywords determined from the user question to generate probabilities that sentences of the selected semantic cluster contain the factoid response; and based on the probabilities, selecting at least one among the sentences of the selected semantic cluster as the response.

14. The one or more computer storage media of claim 8, the operations further comprising:
discovering images within the documentation corpus;
processing at least one among headings, captions, titles, and optical character recognition (OCR) results associated with the images to determine similarity scores to proximate ones of the passages;
selecting at least one of the images each having a corresponding one of the similarity scores within a threshold similarity to the selected semantic cluster; and
providing the at least one of the images with the response to the user question.

15. A system comprising one or more processors and memory configured to provide computer program instructions to the one or more processors, the computer program instructions comprising:
an assistance interface configured to direct the one or more processors to receive a user question related to a subject and provide a response to the user question from among a documentation corpus describing the subject;
an assistance service configured to direct the one or more processors to:
determine a set of passages from the documentation corpus related to the user question;
employ a neural network to rank the set of passages according to probability of relevance to the user question;
produce semantic clusters of sentences extracted from one or more top ranked passages of the set of passages according to sentence similarity;
determine a classification of whether the user question corresponds to a factoid response or a non-factoid response; and
produce the response to the user question based at least on a selected semantic cluster and the classification.

16. The system of claim 15, the assistance service further configured to direct the one or more processors to contextualize the user question against the documentation corpus based on at least one previous user question directed to the documentation corpus.

17. The system of claim 15, the assistance service further configured to direct the one or more processors, based on the classification being that the user question corresponds to the non-factoid response, to:
compute semantic similarity scores among sentences of the set of passages;
group the sentences of the set of passages into associated ones of the semantic clusters based on the semantic similarity scores;
rank the semantic clusters according to relevance to the user question; and
select a top ranked semantic cluster to provide in the response.

18. The system of claim 15, the assistance service further configured to direct the one or more processors to:
catalog images within the documentation corpus;
process at least one among headings, captions, titles, and optical character recognition (OCR) results associated with the images to determine similarity scores to proximate ones of the passages;
select at least one of the images each having a corresponding one of the similarity scores within a threshold similarity to the selected semantic cluster; and
produce the response to include the at least one of the images.

* * * * *

UNITED STATES PATENT AND TRADEMARK OFFICE
CERTIFICATE OF CORRECTION

PATENT NO. : 11,556,573 B2
APPLICATION NO. : 16/888082
DATED : January 17, 2023
INVENTOR(S) : Balaji Vasan Srinivasan et al.

It is certified that error appears in the above-identified patent and that said Letters Patent is hereby corrected as shown below:

In the Claims

Column 20, Line 64:
In Claim 13 the line reading "13. The one or more computer storage media apparatus of" should read
--13. The one or more computer storage media of--.

Signed and Sealed this
Twenty-first Day of March, 2023

Katherine Kelly Vidal
*Director of the United States Patent and Trademark Office*